Nov. 24, 1936.                W. DIETER                2,062,167
                    BRAKE SYSTEM FOR AUTOMOBILES
                        Filed Feb. 26, 1936
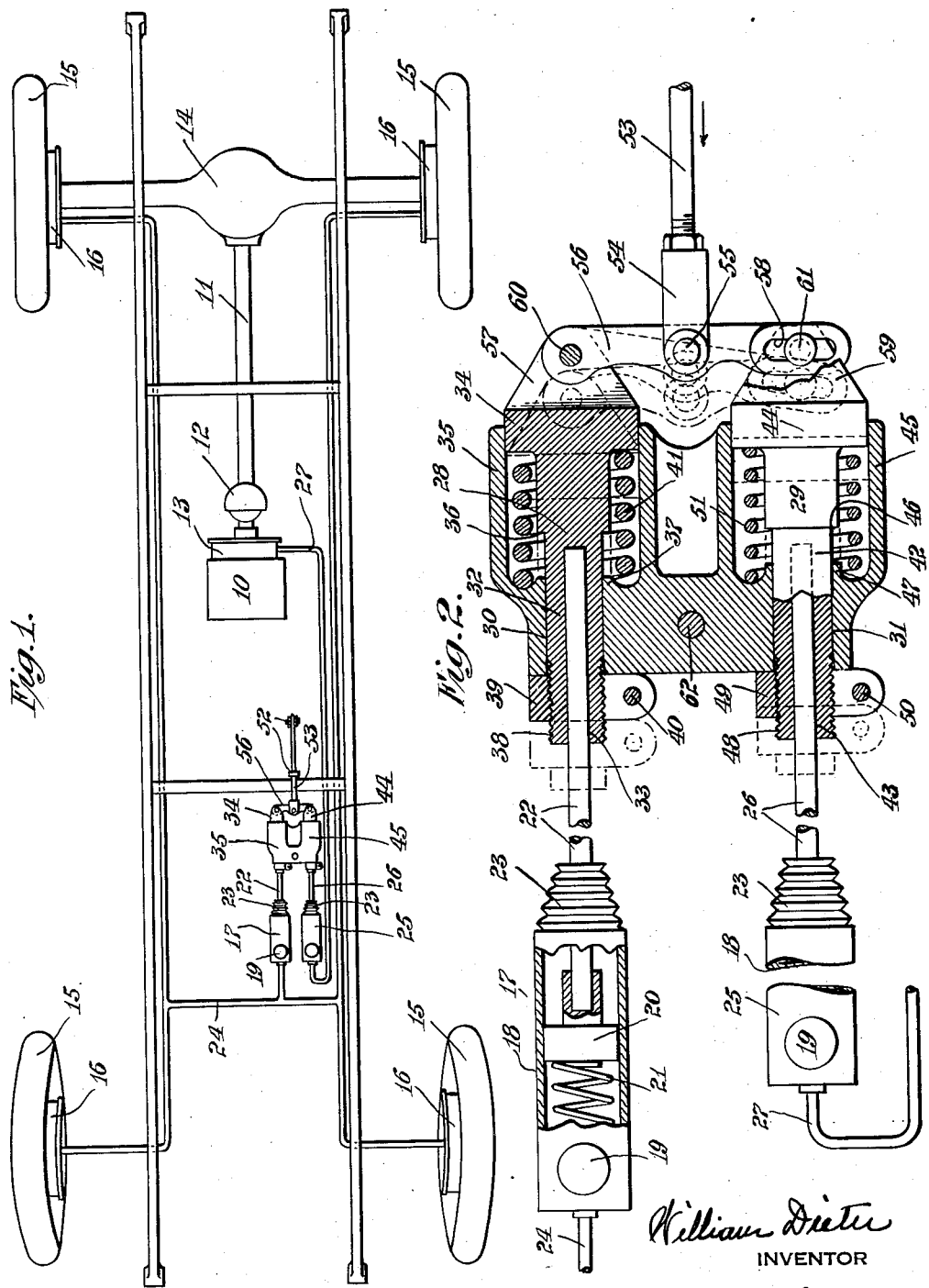

Patented Nov. 24, 1936

2,062,167

UNITED STATES PATENT OFFICE 2,062,167

BRAKE SYSTEM FOR AUTOMOBILES

William Dieter, Newark, N. J.

Application February 26, 1936, Serial No. 65,749

10 Claims. (Cl. 188—152)

The invention relates to brake systems for automobiles, and more particularly to a system in which the braking power is developed through an hydraulic control device and an hydraulic mechanism operative upon the brake mechanism.

Hydraulic brakes are now being extensively used upon automobiles, being applied to either the two rear wheels only or to all four wheels of the vehicle. When actuating the brakes, the power is ordinarily simultaneously developed as to all wheels equipped with braking mechanisms, although when four wheel brakes are used, the braking capacity may be varied as between the front and the rear wheels.

The present tendency in the production of automobiles is to use low slung bodies having mudguards covering a large percentage of the wheels, and this, coupled with the use of the low slung body, develops a tendency of the braking mechanism upon the rear wheels to overheat when high braking power is suddenly developed, because of the obstruction to a free circulation of air adjacent the brake drums upon the rear wheels, a condition present to a much less limited extent about the brake drums upon the front wheels.

In most automobiles as at present designed, the engines have sufficient power to permit the development of high speeds of the vehicle, and there is a tendency of many drivers, particularly in areas where traffic is congested, to rapidly apply the maximum braking power when bringing the vehicle to a stop, even in the absence of the necessity for an emergency stoppage of the vehicle. This is a common practice notwithstanding that a progressive development of braking power is less dangerous and less destructive of the working parts of an automobile, than a sudden application of the maximum braking power. It is also desirable, particularly when the roads are wet or icy, to apply braking power to the vehicle without disconnecting the propeller shaft from the engine drive, or releasing the clutch mechanism, so as to utilize the resistance of the engine in slowing down the vehicle before bringing it to a stop. This practice also tends to equalize the effects of the braking action upon both of the driving wheels, and to avoid skidding as a result of the turning of one of the back wheels independently of the other, because of the continued application of power to both wheels through the differential gearing.

These problems are not present so far as the application of brake power to the front wheels is concerned. The application of such power to the front wheels, however, is undesirable when sharply turning these wheels, as when going around a corner.

In the manufacture of automobiles, they are designed with the view of adapting them not only to the most efficient practices in applying the brakes, but to secure as high efficiency as possible, notwithstanding a departure from these practices; and notwithstanding the fact that a very high percentage of automobile drivers are lacking in the proper knowledge of the mechanics of the vehicle and a proper handling thereof, or totally disregard proper practices to avoid undue racking of the vehicle and reduce likelihood of accidents.

With the above conditions in mind, I have provided a braking system by which, with an ordinary operation of the hydraulic control device, braking power will not only be progressively developed irrespective of the actions of the driver, but will be applied in a manner to ensure the simultaneous application of such power to both of the driving wheels of a vehicle, whether the engine clutch is set or released, which application of power will be followed by the application of brake power to the hydraulic braking mechanisms upon the wheels of the vehicle, whether such mechanisms be used upon the rear wheels only or upon all four wheels.

With the braking system of my invention, a slowing down of the vehicle is assured before any material or the maximum braking power can be developed upon the several wheels, and in this manner the driving wheels are controlled in much the same way as though the propeller shaft were connected through the clutch mechanism with the engine.

By a seriatim application of power in the manner contemplated, development of excessive torque upon the propeller shaft is prevented even when the brakes are applied while the vehicle is running at high speeds, since the initial application of brake power to the propeller shaft is immediately followed by the application of brake power to the wheels of the vehicle, thus relieving the shaft of excessive strains due to the momentum of the vehicle.

I secure the above results by providing hydraulic brake mechanisms upon the propeller shaft as well as upon the wheels of the vehicle, separate hydraulic control mechanisms being used for the propeller shaft brake mechanism and for the wheel brake mechanisms. These hydraulic control mechanisms are acted upon by a single mechanical control device which will successively actuate the hydraulic control devices, furnishing power to the hydraulic brake mechanism acting upon the propeller shaft; and the hydraulic control device furnishing power for the brake mechanisms operative upon the wheels of the vehicle.

This mechanical control device is so constructed as to not only actuate the two hydraulic control devices, but to actuate them in a timed relation to each other, so that a variable operation of the mechanical control device will result in a varying condition in the application of brake power to the vehicle.

The mechanical control device is so constructed as to permit relative adjustment of the parts operative upon the hydraulic control for the propeller shaft brake mechanism, and the hydraulic control for the wheel brake mechanisms, thus permitting a setting of the devices to secure the desired progressive development of braking action upon the vehicle through the brake mechanisms upon the propeller shaft and the wheels.

The invention consists primarily in a brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means simultaneously applying power to both of said plungers, and means resisting movement of each of said plungers by said last named means, one of said resistance means having relatively greater strength than the other, whereby said two hydraulic control devices will be successively actuated with a continued application of power to said mechanical control devices; and in such other novel features of construction and combination of parts as are hereinafter set forth and described, and more particularly pointed out in the claims hereto appended.

Referring to the drawing,

Fig. 1 is a plan view of a portion of the chassis of an automobile having a brake system embodying the invention applied thereto; and Fig. 2 is a view, partly in section and partly condensed, showing hydraulic control devices and a mechanical control device embodying the invention.

Like numerals refer to like parts in both of said views.

In the embodiment of the invention shown in the drawing, the gear box of an automobile is indicated at 10, the propeller shaft at 11, a universal joint at 12 in the length of said shaft, and an hydraulic brake mechanism 13 of ordinary construction applied to said propeller shaft intermediate the universal joint and the gear box. This arrangement is purely arbitrary, although preferable as avoiding possibility of breakage of the piping because of movement of the propeller shaft between the universal joint and the differential gearing, the housing of which is shown at 14.

Each of the wheels 15 of the vehicle is shown as having an hydraulic brake mechanism 16 applied thereto.

The construction of the hydraulic brake mechanisms 13 and 16 is immaterial to the invention and may have any desired construction, many such constructions being well known in the art.

The application of power to the hydraulic brake mechanisms 16 is controlled by an hydraulic control device 17 which, as shown, is of a construction now commonly used, and embodies therein a cylinder 18 having a fluid regulating chamber 19, a piston 20, a restoring spring 21 acting thereon, a piston stem 22 and a collapsible bellows head 23 forming a fluid tight joint with the piston stem 22. The stem 22 ordinarily is loosely connected with the piston 20.

The outlet of the cylinder 18 discharges into a pipe line 24 leading to the hydraulic brake mechanisms 16 acting upon the several wheels of the vehicle, so that with movement of the piston 20 inwardly of the cylinder 18 against the tension of the spring 21, fluid from the cylinder will be simultaneously delivered to the cylinders of all hydraulic brake mechanisms 16.

The application of power to the hydraulic brake mechanism 13, acting upon the propeller shaft, is controlled by an hydraulic control mechanism 25 similar in construction to the hydraulic control mechanism 17, so that a recitation of the details of this mechanism is unnecessary.

The piston stem of the hydraulic control mechanism 25 is indicated at 26, and the outlet of the cylinder of this control mechanism is connected with the hydraulic brake mechanism 13 by a pipe line 27.

The detailed construction and mode of operation of the hydraulic brake mechanisms 13 and 16 and of the control cylinders 17 and 25 is that commonly used in the hydraulic brake systems now largely used upon automobiles. In such systems, however, the practice is to use only one hydraulic control mechanism and brake mechanisms operative only upon the wheels of the vehicle. The use of hydraulic brake mechanisms operative both upon the wheels and upon the propeller shaft, I believe to be novel, but this arrangement requires the use of a mechanical control device actuated from a single source of power in order to secure a useful result.

To secure the effective utilization of hydraulic braking mechanisms arranged as are the braking mechanisms 13 and 16, it is necessary to employ a mechanical control device, the operation of which, by a continuing movement, will first actuate the hydraulic brake mechanism 13 and thereafter actuate the hydraulic brake mechanism 16, without releasing the brake mechanism 13.

In the accompanying drawing, I have shown a mechanical control mechanism which will secure the desired action, this mechanism comprising two adjacent reciprocatory plungers 28 and 29 mounted in suitable bearings 30 and 31.

The end of the plunger 28 is reduced, as indicated at 32, so as to afford a bearing area co-operating with the bearing 30, and this reduced portion is recessed, as indicated at 33, to receive the piston stem 22 of the piston 20. The head 34 of the plunger is preferably enlarged so as to have a free sliding fit within a cylindrical spring housing 35.

Intermediate the head 34 and the reduced portion 32 is a stop shoulder 36 adapted, by engagement with a shoulder 37 at one end of the housing 35, to limit the reciprocation of the plunger toward the hydraulic control mechanism 17.

The end of the reduced portion 32 of the plunger 28 is screw threaded as shown at 38, and co-operating with said screw thread is a split nut 39 which may be locked in any adjusted position upon the plunger by means of a lock bolt 40 so as to limit the reciprocatory movement of the plunger away from the hydraulic control mechanism 17.

Acting between the enlarged head 34 of the plunger 28 and the spring housing 35 is a coiled spring 41 tending to impart movement to the plunger until the lock nut 39 is engaged with the end of the bearing 30, and to resist plunger movement.

The plunger 29 is of the same construction as the plunger 28. It has a reduced end portion 42 having therein a longitudinal socket 43 for the reception of the piston stem 26. Said plunger 29 is also provided with an enlarged head 44 having a free sliding fit in a spring housing 45. Intermediate the enlarged head 44 and the reduced end 42 is a shoulder 46 adapted, by engagement with a stop shoulder 47 within the spring housing, to limit the reciprocatory movement of the plunger 29 toward the hydraulic control device 25. The reduced end 42 is provided with exterior screw threads 48 co-operating with which is a split lock nut 49 adapted to be set in any adjusted position by means of a lock bolt 50. This lock nut has the same function as the lock nut 39, that is, to limit reciprocatory movement of the plunger away from the hydraulic control device 25.

Within the spring housing 45 and acting between one end of this housing and the enlarged head 44 of the plunger 29 is a coiled spring 51 having a function similar to that of the spring 41.

The hydraulic control device 17 is required to deliver fluid to two or four hydraulic brake mechanisms 16 acting upon the wheels 15. The hydraulic control device 25 is required to deliver fluid to only one hydraulic brake mechanism 13 acting upon the propeller shaft. The various parts must be so proportioned as to ensure the delivery of a proper amount of fluid to actuate the various hydraulic brakes.

In the accompanying drawing the plunger 29 is shown as having a relatively shorter movement than the plunger 28, and the hydraulic brake mechanism 13 as having relatively greater cylinder capacity than any hydraulic brake mechanism 16. The shorter movement of the plunger 19 results from the use of a longer stop shoulder 47 within the spring housing 45.

As will more fully appear hereinafter, the operation of the brake system of the invention requires that the plunger 29 receive a substantially full reciprocatory movement toward the hydraulic control device 25 before sufficient movement has been imparted to the plunger 28 to cause the actuation of the hydraulic control device 17 in a manner to develop braking action by the hydraulic brake mechanism 16, thus ensuring the application of substantially the full braking capacity of the hydraulic brake mechanism 13 before any substantial braking action is developed in the various hydraulic brake mechanisms 16.

To ensure a proper timing of the actuation of the plungers 28 and 29, the spring 41 is relatively stronger than the spring 51, thus assuring sufficiently great resistance to the movement of the plunger 28 to compel a substantially full movement of the plunger 29 before any movement is imparted to the plunger 28. In other respects both springs 41 and 51 act merely as restoring springs.

In the accompanying drawing, the invention is shown as applied to a brake system in which the primary source of power is a foot pedal indicated at 52. Connected with the lever of this pedal is a link 53 having a forked end 54. The forked end 54 is pivoted at 55 to a rocking cross head 56. One end of this head is pivoted between lugs 57 upon the plunger 28, and the other end thereof is pivoted by means of a lost motion conection afforded by a slot 58 between lugs 59 carried by the plunger 29. The pivot connecting the cross head 56 with the lugs 57 is shown at 60, and the pivot connecting the cross head 56 with the plunger 29 is shown at 61.

Preferably, the spring housings 35 and 45 are formed in a single casting which may be mounted upon the end frame of a car by means of a bolt 62, or in any other desired manner.

The operation of the herein described braking mechanism for automobiles is substantially as follows:—

When an automobile is running free, the fluid for operating the hydraulic brakes is accumulated in the hydraulic control mechanisms 17 and 25 and the pipes 24 and 27, there being but a small volume of such fluid in the cylinders of the various hydraulic brake mechanisms.

Upon the depression of the foot pedal 52, the link 53 is thrust towards the hydraulic control mechanisms 17 and 25. With this link movement, the cross head rocks about the pivots 55 and 60, the spring 41 resisting movement of the end adjacent to said head. The thrust of the link 53 is thus applied solely to the plunger 29, the lower tension of the spring 51 permitting movement of the plunger 29 to actuate the hydraulic control mechanism 25 in a manner to deliver fluid to the hydraulic brake mechanism 13 in sufficient volume to apply braking action to the propeller shaft 11.

The resistance to the movement of the plunger 29, until braking action is developed in the hydraulic brake mechanism 13, is measured by the tension of the spring 51 and the springs embodied in the hydraulic control mechanism 25 and the hydraulic brake mechanism 13. Following the initial development of braking action by the mechanism 13, resistance to movement of said plunger builds up rapidly until the aggregate resistance to such movement exceeds that of the spring 41, the springs 21 and the springs of the hydraulic brake mechanisms 16. Thereupon, the plunger 28 will be advanced to actuate the hydraulic control mechanism 17, this movement resulting from a reversal of the pivotal movement of the cross head 56. During the early part of the movement of the plunger 28, and until the several brake mechanisms 16 have developed initial braking action, there is no substantial increase in resistance to the plunger movement. At this point in the operation of the brakes 13 and 16, the resistance to the movement of the plunger 29 is still greater than that to the movement of the plunger 28. Thereafter, resistance to movement of the plunger 28 builds up rapidly until there is an equilibrium of pressures resisting movement of both plungers, whereupon both plungers will be simultaneously advanced until an overbalancing resistance is developed as to one of the plungers. Thereupon, the above action is repeated until the maximum braking action is developed by the operation of one hydraulic control mechanism, which is immediately followed by the development of the maximum braking action by the operation of the other hydraulic control mechanism.

With the above operation, the maximum braking action cannot be developed in either the propeller shaft brake mechanism or the wheel brake mechanisms until after braking action has been developed in the other brake mechanism. The initial braking will be of the propeller shaft, and this action is followed by the braking of the wheels. Following this, there is increased braking action successively upon said shaft and the wheels until the maximum braking action on both is reached. Since this condition results from a shifting of the preponderating resistance to the movement of one plunger 28 or the other plunger 29, it is obvious that the cross head 56 may rock repeatedly before the maximum braking action is developed in either or both brake mechanisms 13 and 16. The fulcrum of movement of the cross head 56 shifts with the shifting of the preponderating resistance from one plunger to the other.

Notwithstanding the fluctuating resistance pressures above referred to, there is only a constant progressively increasing resistance at the point of application of primary braking power to the mechanical control mechanism, the braking action, so far as the driver is concerned, being substantially the same, or possibly somewhat easier, than with the use of ordinary hydraulic brake systems.

When the mechanical control mechanism is relieved from applying braking power, the springs 41 and 51 restore the plungers 28 and 29 to their inoperative positions, thus permitting the pistons of the hydraulic control devices to function to permit the release of the brake mechanisms 13 and 16. If desired, said springs 41 and 51 need be the only restoring springs used when a foot pedal control is employed.

I prefer to use springs, as 41 and 51, to develop the desired resistance to movement of the plungers 28 and 29, since by the use of adjustment nuts 39 and 49, the resistance to the plunger movement, or the relative resistance to the movement of the plungers may be varied when adjusting the brakes.

When it is desired to lower the speed of, or to stop, a vehicle, braking power is applied to the rocking cross head 56 in the usual, or any desired manner. This power is utilized to first actuate the hydraulic brake mechanism 13 to develop braking action on the propeller shaft 11, and therethrough upon both driving wheels to the same extent. The control of the action of the plungers 28 and 29 as above described, however, prevents the development of the maximum braking action by said mechanism 13 until braking action has been developed in the hydraulic brake mechanisms acting upon the driving wheels or upon both said wheels and the front wheels of the vehicle. This retardation in the development of the maximum braking action by the propeller shaft brake mechanism not only relieves the shaft from the rapid development of torque stresses from the moving inertia of the vehicle, but places restraint upon the driving wheels resembling that resulting from the action of the engine when the clutch is not released when braking, and relieves the engine itself from the effect of power applied through the shaft as a result of such moving inertia. The application of the brake mechanism 13 will reduce the speed of the vehicle prior to the application of the wheel brakes, irrespective of the speed of the vehicle. If the vehicle speed is low, application of the wheel brakes may be unnecessary, but at higher speeds, or for an emergency stop, following the reduction of speed by the application of the propeller shaft brake 13, the wheel brakes 16 may be rapidly applied so as to add their braking power to that of the propeller brake. Following the initial application of the wheel brake mechanism 16, their braking action, as well as that of the brake mechanism 13 will be increased, until the maximum braking action of both is reached.

At all times following the actuation of the hydraulic braking mechanism 13, said mechanism is operative upon the propeller shaft, but its action may be variable and the maximum braking action cannot be attained until the hydraulic braking mechanisms 16 are operative upon the driving wheels. This minimizes likelihood of skidding.

In the event of accidental lowering of the fluid supply for actuating either the brake mechanism 13 or the brake mechanisms 16, a limited braking action may still be obtained by the actuation of the cross head 56, since the use of separate, independent hydraulic control mechanisms and pipe lines reduces to a minimum, likelihood of all brake mechanisms becoming inoperative at the same time from different causes.

By limiting the amount of reciprocatory movement of the plunger 29 towards the control mechanism 25, the maximum braking action by the mechanism 13 may be limited.

In Fig. 2 of the drawing, the normal, inoperative position of the cross head 56, and of the parts of the mechanical control mechanism actuated thereby, is shown in full lines; their position when developing braking action by the mechanism 13 alone is shown in dotted lines, and their position when an equilibrium of resistance pressures is established as to both plungers, in dot and dash lines.

I believe it to be broadly new in a brake system for automobiles to utilize an hydraulic brake mechanism acting upon the propeller shaft, hydraulic brake mechanisms acting upon the wheels of an automobile, separate hydraulic control mechanisms associated with said propeller shaft and said wheel brake mechanisms respectively, and a mechanical control mechanism through which said hydraulic control mechanisms are actuated from a common source to successively apply braking power to the propeller shaft and to the wheels and prevent the development of maximum braking power upon either the propeller shaft or the wheels until both hydraulic brake mechanisms have been actuated.

It, therefore, is not my intention to limit the invention to the particular construction of hydraulic brake mechanism and hydraulic control mechanism used, nor to the details of construction of the mechanical control mechanism shown in the accompanying drawing, except as defined by the appended claims, it being obvious that such may be varied without departing from the spirit and scope of the invention.

Having described the invention, what I claim as new and desire to have protected by Letters Patent, is:—

1. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means simultaneously applying power to both of said plungers, and means resisting movement of each of said plungers by said last named means, one of said resistance means having relatively greater strength than the other, whereby said two hydraulic control devices will be successively actuated with a continued application of power to said mechanical control devices.

2. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, a reciprocatory link, a cross head pivotally connected therewith intermediate its ends, a pivotal connection between one end of said cross head and one of said plungers, a lost motion pivotal connection between the other end of said cross head and the other of said plungers, and means resisting movement of each of said plungers by said last named means, one of said resistance means having relatively greater strength than the other, whereby said two hydraulic control devices will be successively actuated with a continued application of power to said mechanical control devices.

3. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means simultaneously applying power to both of said plungers, and springs of relatively different tensions acting respectively upon said plungers, the spring of lower tension being associated with the plunger operative upon the hydraulic control device connected with the brake mechanism upon the propeller shaft, whereby said two hydraulic control devices will be successively actuated with a continued application of power to said mechanical control devices.

4. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, a reciprocatory link, a cross head pivotally connected therewith intermediate its ends, a pivotal connection between one end of said cross head and one of said plungers, a lost motion pivotal connection between the other end of said cross head and the other of said plungers, and springs of relatively different tensions acting respectively upon said plungers, the spring of lower tension being associated with the plunger operative upon the hydraulic control device connected with the brake mechanism upon the propeller shaft, whereby said two hydraulic control devices will be successively actuated with a continued application of power to said mechanical control devices.

5. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means limiting the movement of the plunger operative upon the control device connected with the brake mechanism upon the propeller shaft, and means resisting movement of each of said plungers by said last named means, one of said resistance means having relatively greater strength than the other, whereby said two hydraulic control devices will be successively actuated with a continued application of power to said mechanical control devices.

6. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means limiting the movement of the plunger operative upon the control device connected with the brake mechanism upon the propeller shaft, a reciprocatory link, a cross head pivotally connected therewith intermediate its ends, a pivotal connection between one end of said cross head and one of said plungers, a lost motion pivotal connection between the other end of said cross head and the other of said plungers, and means resisting movement of each of said plungers by said last named means, one of said resistance means having relatively greater strength than the other, whereby said two hydraulic control devices will be successively actuated with a continued application of power to said mechanical control devices.

7. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means limiting the movement of the plunger operative upon the control device connected with the brake mechanism upon the propeller shaft, means simultaneously applying power to both of said plungers, and springs of relatively different tensions acting respectively upon said plungers, the spring of lower tension being associated with the plunger operative upon the hydraulic control device connected with the brake mechanism upon the propeller shaft, whereby said two hydraulic control devices will be successively actuated with a continued application of power to said mechanical control devices.

8. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means simultaneously applying power to both of said plungers, adjustable means permitting the relative setting of said plungers to limit the reciprocatory movement thereof, and means resisting movement of each of said plungers by said last named means, one of said resistance means having relatively greater strength than the other, whereby said two hydraulic control devices will be successively actuated with a continued application of power to said mechanical control devices.

9. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, means simultaneously applying power to both of said plungers, springs of relatively different tensions acting respectively upon said plungers, the spring of lower tension being associated with the plunger operative upon the hydraulic control device connected with the brake mechanism upon the propeller shaft, whereby said two hydraulic control devices will be successively actuated with a continued application of power to said mechanical control devices, and adjustable means permitting the relative setting of said plungers to limit the reciprocatory movement thereof.

10. A brake system for automobiles embodying therein a propeller shaft, an hydraulic brake mechanism operative thereon, wheels, and an hydraulic brake mechanism operative upon each wheel, of a plurality of hydraulic control devices, one of said devices being connected with the hydraulic brake mechanism upon the propeller shaft, and the other hydraulic control mechanism being connected with the brake mechanisms of the wheels, and a mechanical control device embodying therein reciprocatory plungers operative upon said hydraulic control devices respectively, a reciprocatory link, a cross head pivotally connected therewith intermediate its ends, a pivotal connection between one end of said cross head and one of said plungers, a lost motion pivotal connection between the other end of said cross head and the other of said plungers, springs of relatively different tensions acting respectively upon said plungers, the spring of lower tension being associated with the plunger operative upon the hydraulic control device connected with the brake mechanism upon the propeller shaft, whereby said two hydraulic control devices will be successively actuated with a continued application of power to said mechanical control devices, and adjustable means permitting the relative setting of said plungers to limit the reciprocatory movement thereof.

WILLIAM DIETER.